(12) United States Patent
Doerr et al.

(10) Patent No.: US 12,447,347 B2
(45) Date of Patent: Oct. 21, 2025

(54) HYPERTENSION THERAPY

(71) Applicant: BIOTRONIK SE & Co. KG, Berlin (DE)

(72) Inventors: Thomas Doerr, Berlin (DE); Ingo Weiss, Berlin (DE); Ulrich Busch, Berlin (DE)

(73) Assignee: BIOTRONIK SE & Co. KG, Berlin (DE)

(*) Notice: Subject to any disclaimer, the term of this patent is extended or adjusted under 35 U.S.C. 154(b) by 337 days.

(21) Appl. No.: 17/920,536

(22) PCT Filed: Apr. 16, 2021

(86) PCT No.: PCT/EP2021/059901
§ 371 (c)(1),
(2) Date: Oct. 21, 2022

(87) PCT Pub. No.: WO2021/219403
PCT Pub. Date: Nov. 4, 2021

(65) Prior Publication Data
US 2023/0149717 A1 May 18, 2023

(30) Foreign Application Priority Data
Apr. 27, 2020 (EP) .................................. 20171522

(51) Int. Cl.
A61N 1/362 (2006.01)
A61N 1/365 (2006.01)
A61N 1/368 (2006.01)

(52) U.S. Cl.
CPC ......... A61N 1/3627 (2013.01); A61N 1/3682 (2013.01); A61N 1/3684 (2013.01)

(58) Field of Classification Search
CPC . A61N 1/365; A61N 1/36514; A61N 1/36564
See application file for complete search history.

(56) References Cited

U.S. PATENT DOCUMENTS

| | | | |
|---|---|---|---|
| 9,333,352 B2 | 5/2016 | Mika et al. | |
| 9,333,353 B2 | 5/2016 | Decre et al. | |
| 2004/0215266 A1 | 10/2004 | Struble et al. | |
| 2010/0174333 A1 | 7/2010 | Dewals | |
| 2016/0193470 A1 | 7/2016 | Amblard et al. | |
| 2016/0220824 A1 | 8/2016 | Schwartz et al. | |
| 2016/0310733 A1* | 10/2016 | Sheldon | A61N 1/3756 |
| 2019/0299003 A1 | 10/2019 | Hahn et al. | |

OTHER PUBLICATIONS

International Search Report (PCT/ISA/210) and Written Opinion (PCT/ISA/237) mailed on Jul. 13, 2021, by the European Patent Office as the International Searching Authority for International Application No. PCT/EP2021/059901.
European Office Action for European Application No. 21 718 586.7 dated Aug. 29, 2025.

* cited by examiner

Primary Examiner — Brian T Gedeon
(74) Attorney, Agent, or Firm — Buchanan Ingersoll & Rooney PC

(57) ABSTRACT

An implantable device for stimulating a heart to lower blood pressure, comprising: a stimulation unit configured to stimulate a ventricle, and a sensing unit for detecting atrial activity of the heart, wherein the stimulation unit is configured to stimulate the ventricle for at least one cardiac cycle with a predefined delay after detection of an atrial activity or to not stimulate the ventricle for at least one cardiac cycle.

11 Claims, 5 Drawing Sheets

HYPERTENSION THERAPY

CROSS-REFERENCE TO RELATED APPLICATIONS

This application is the United States National Phase under 35 U.S.C. § 371 of PCT International Patent Application No. PCT/EP2021/059901, filed on Apr. 16, 2021, which claims the benefit of European Patent Application No. 20171522.4, filed on Apr. 27, 2020, the disclosures of which are hereby incorporated by reference herein in their entireties.

TECHNICAL FIELD

The present invention relates to a device and a method for treating hypertension by means of cardiac stimulation therapy.

BACKGROUND

A method for treating hypertension is, for example, disclosed in U.S. Pat. No. 9,333,352 which describes methods for blood pressure lowering heart stimulation. The methods are based on making the timing inefficient so that the cardiac output decreases and, as a result, the blood pressure. As an example, U.S. Pat. No. 9,333,352 teaches to deliver ventricular stimulation at the same time as atrial activity, or shortly after, or before. Particularly, U.S. Pat. No. 9,333,352 discloses to deliver ventricular stimulation with a time delay of 0 to 50 ms after atrial activity.

Thus, for patients with pacemakers, blood pressure can be lowered by physiologically inefficient stimulation in the atrium. However, for patients with intact AV transition this may mean unnecessary right ventricular stimulation.

Therefore, a problem to be solved by the present invention is to provide an implantable device and a method that allows reducing the blood pressure permanently in combination with a cardiac stimulation that reduces the risk of the above-described unwanted effect of unnecessary right ventricular stimulation.

At least this problem is solved by an implantable device having the features of claim 1 as well as by a method having the features of claim 9.

Preferred embodiments of these aspects of the present invention are stated in the corresponding sub claims and are described below.

According to claim 1, an implantable device for stimulating a heart of a patient to lower blood pressure of the patient is disclosed, comprising:
 a stimulation unit configured to stimulate a ventricle of the heart, and
 a sensing unit for detecting atrial activity of the heart.

According to the present invention, the stimulation unit is configured to stimulate the ventricle for at least one cardiac cycle with a predefined delay after detection of an atrial activity and to subsequently suspend the ventricular stimulation for at least one cardiac cycle, wherein the implantable device is configured to suspend stimulation of the ventricle triggered by said detection of an atrial activity after a predefined number of heart cycles or after a predetermined time period for a number of heart cycles or for a predetermined time period.

According to claim 2, an alternative implantable device for stimulating a heart of a patient to lower blood pressure of the patient is disclosed, comprising:
 a stimulation unit configured to stimulate a ventricle of the heart,
 a sensing unit for detecting atrial activity of the heart, and
 a stimulation unit configured to stimulate an atrium.

According to the present invention, the stimulation unit is configured to stimulate the ventricle for at least one cardiac cycle with a predefined delay after detection of an atrial activity or with a predefined delay after the stimulation of an atrium and to subsequently suspend the ventricular stimulation for at least one cardiac cycle, wherein the implantable device is configured to suspend stimulation of the ventricle triggered by said detection of an atrial activity after a predefined number of heart cycles or after a predetermined time period for a number of heart cycles or for a predetermined time period, wherein the implantable device is configured to suspend stimulation of the ventricle triggered by said detection of an atrial activity or triggered by an atrial stimulation after a predefined number of heart cycles or after a predetermined time period for a number of heart cycles or for a predetermined time period.

The present disclosure is directed toward overcoming one or more of the above-mentioned problems, though not necessarily limited to embodiments that do.

SUMMARY

According to an embodiment of the present invention, the implantable device for stimulating comprises a sensing unit for detecting ventricular activity of the heart.

Preferably, according to an embodiment of the present invention, the implantable device comprises a stimulation unit configured to stimulate an atrium, wherein the stimulation unit is configured to stimulate the ventricle for at least one cardiac cycle with a predefined delay after detection of an atrial activity or with a predefined delay after the stimulation of an atrium and to subsequently not stimulate the ventricle with a predefined delay after the detection of an atrial activity for at least one cardiac cycle.

According to an embodiment, said delay is less than 100 ms, preferably less than 90 ms, preferably less than 80 ms, preferably less than 70 ms, preferably less than 60 ms, preferably less than 50 ms, preferably less than 40 ms, preferably less than 30 ms, preferably less than 20 ms, preferably less than 10 ms.

Furthermore, according to an embodiment, said delay is adjustable, wherein particularly the implantable device is configured to adjust the delay to be shorter than an intrinsic AV delay of the patient. For this, the stimulation unit can comprise a timer control circuit that enables the stimulation unit to perform said stimulation of the ventricle with an adjustable delay after detection of the atrial activity.

Furthermore, according to an embodiment, the stimulation unit comprises a sequence control circuit which is configured to activate the stimulation unit to stimulate the ventricle triggered by said detection of an atrial activity or triggered by an atrial stimulation and to suspend such a stimulation.

Particularly, the adjustable delay is derived from a measured intrinsic AV delay of the patient.

Furthermore, according to an embodiment, the implantable device comprises a ventricular sensing unit, and wherein the implantable device is configured to measure an intrinsic AV delay of the patient and to adjust said adjustable delay depending on the measured intrinsic AV delay, wherein the adjustable delay is adjusted to be shorter than said measured intrinsic AV delay.

Further, according to an embodiment, the stimulation unit is configured to stimulate the ventricle irrespective of atrial activity for at least one cardiac cycle after the detection of an atrial activity or after the stimulation of an atrium in the absence of intrinsic AV conduction. This embodiment represents a safety function (VVI-backup-mode) of the implantable device in case no intrinsic AV delay has been measured. That function is particularly useful if no AV delay is used as pacing parameter.

In other words, the switching of the stimulation phases can be interval-controlled, i.e., after a number of heart cycles of atrial-controlled stimulation, the atrial-controlled stimulation is suspended for a number of heart cycles or replaced with stimulation without AV delay.

Alternatively, the switching of the stimulation phases can be time-controlled, or it is time- and interval-controlled. Furthermore, the switching of the stimulation phases can be carried out depending on one or more parameters which can be assigned to the systemic blood pressure and which are recorded by the implantable device or another device.

According to a further embodiment, the implantable device is configured to depending on one or more parameters that are indicative of the systemic blood pressure, suspend the stimulation of the ventricle triggered by the detection of an atrial activity or triggered by an atrial stimulation.

Furthermore, according to an embodiment, the implantable device is configured to measure said parameter(s) or to receive said parameter(s) from another device.

Furthermore, according to an embodiment, the ventricle is the right ventricle. According to an alternative embodiment, the ventricle is the left ventricle. According to yet another embodiment the implantable device, particularly the stimulation unit, is configured to stimulate the left and the right ventricle for at least one cardiac cycle with a delay after detection of an atrial activity or to not stimulate the left and the right ventricle for at least one cardiac cycle.

Furthermore, in case the right ventricle is stimulated, the implantable device can comprise a first electrode lead configured to be implanted in the right ventricle and to apply electrical stimulation to the right ventricle, and a second electrode lead configured to be implanted into the right atrium and configured to sense atrial activity of the right atrium.

Alternatively, in case the left ventricle is stimulated, the first electrode lead can be configured to be implanted in the left ventricle and to apply electrical stimulation to the left ventricle, while the second electrode lead can be configured as stated above (i.e., implanted in the right atrium).

Furthermore, in case both ventricles are stimulated, the implantable device can comprise a first electrode lead configured to be implanted in the right ventricle and to apply electrical stimulation to the right ventricle, and a second electrode lead configured to be implanted into the right atrium and configured to sense atrial activity of the right atrium, and a third electrode lead configured to be implanted in the left ventricle and to apply electrical stimulation to the left ventricle.

In all the cases stated above, alternatively, the atrial activity of the left atrium can be sensed instead of the atrial activity of the right atrium. For sensing the atrial activity of the left atrium, the respective electrode implanted in the left ventricle may comprise one or more additional electrode poles in the region of the left atrium to sense atrial activity of the left atrium, wherein the electrode in the right atrium can be omitted.

According to a further aspect of the present invention, a method for lowering blood pressure by means of cardiac stimulation is disclosed, wherein the method preferably uses an implantable device according to the present invention, wherein the ventricle is stimulated for at least one cardiac cycle with a predefined delay after detection of an atrial activity or after an atrial stimulation or subsequently not stimulated for at least one cardiac cycle.

Furthermore, according to an embodiment of the inventive method, the ventricle is stimulated for at least one cardiac cycle with a predefined delay after detection of an atrial activity or with a predefined delay after the stimulation of an atrium and is subsequently not stimulated synchronously after atrial activity or an atrial stimulation for at least one cardiac cycle.

According to an embodiment of the inventive method, the ventricle is stimulated irrespective of atrial activity for at least one cardiac cycle after the detection of an atrial activity or after the stimulation of an atrium in the absence of intrinsic AV conduction. This embodiment represents a safety function (VVI-backup-mode) of the implantable device in case no intrinsic AV delay has been measured. That function is particularly useful if no AV delay is used as pacing parameter.

According to an embodiment of the inventive method, said adjustable delay is selected to be shorter than an intrinsic AV delay of the patient, particularly in case the patient does not suffer from Heart Failure with preserved Ejection Fraction (HF-PEF), or, in case the patient does suffer from HF-PEF, is selected to be shorter than an intrinsic AV delay which the patient would have on average based on, e.g., at least age and sex if he/she did not suffer from HF-PEF.

According to a further embodiment of the inventive method, the cardiac stimulation is delivered to patients indicated with Heart Failure with preserved Ejection Fraction (HF-PEF).

Particularly, in case the patient has HF-PEF, the method according to the present invention is for permanently reducing end-diastolic pressure in humans suffering from HF-PEF, in particular.

In case the patient has HF-PEF, the cardiac stimulation of the ventricle based triggered by detection of atrial activity can also be applied to the His bundle or to the left bundle branch of the patient instead. Thus, regarding the above-described method and device the stimulation of the ventricle triggered by detection of atrial activity (e.g., using the delay being shorter than the intrinsic AV delay) can be substituted by a corresponding stimulation of the His bundle or the left bundle branch of the heart by the patient that is then triggered by detection of atrial activity, respectively.

Additional features, aspects, objects, advantages, and possible applications of the present disclosure will become apparent from a study of the exemplary embodiments and examples described below, in combination with the Figures and the appended claims.

BRIEF DESCRIPTION OF THE DRAWINGS

In the following, embodiments, further features and advantages of the present invention shall be described with reference to the Figures which depict preferred embodiments of the present invention, wherein.

DETAILED DESCRIPTION

Figure 1:
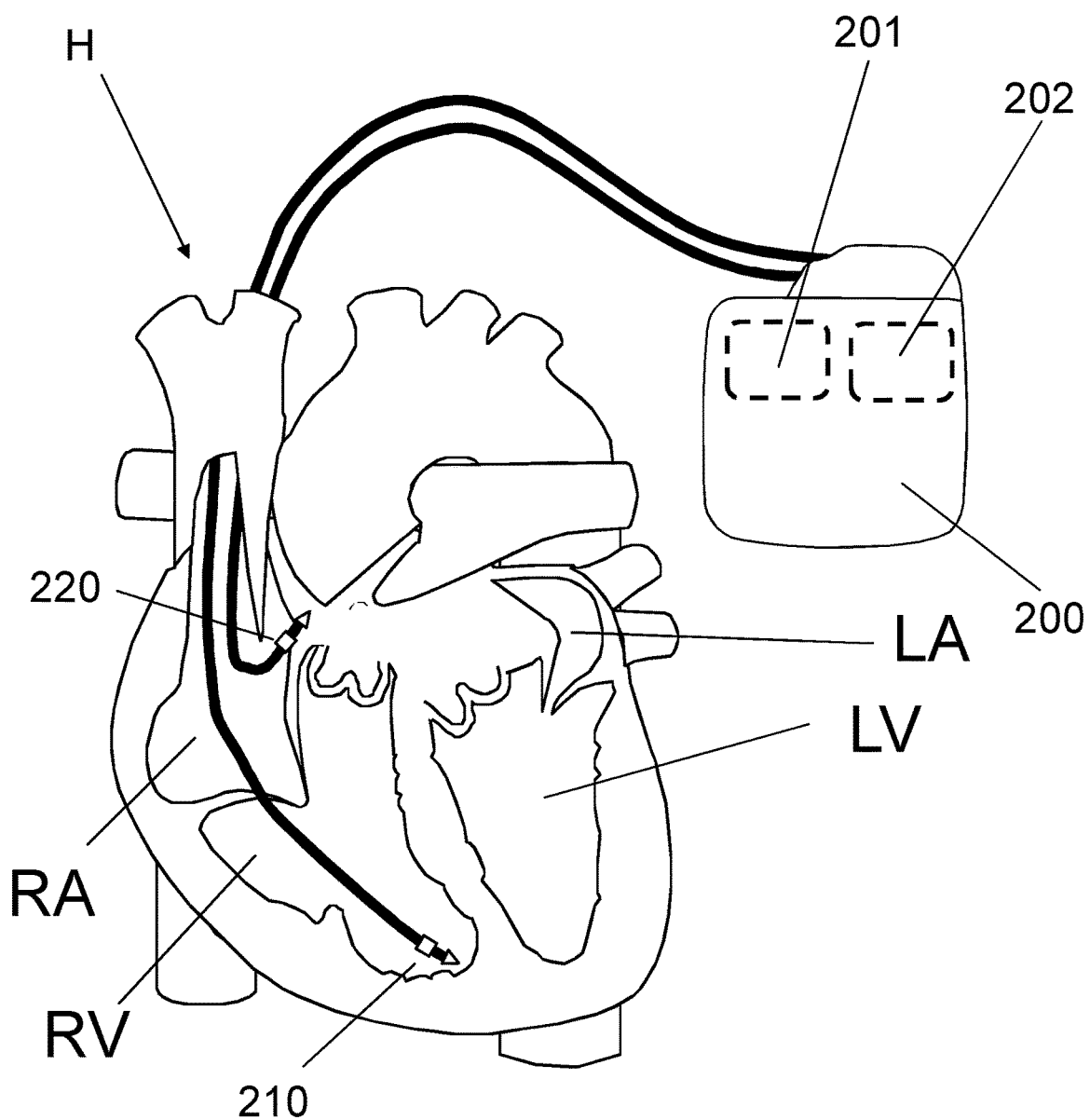
FIGS. 1-4 show different embodiments of an implantable device according to the present invention.

FIG. 1 shows an embodiment of an implantable device 200 for stimulating a heart H of a patient to lower blood pressure of a patient suffering from hypertension. Particularly, the method and device according to the present invention can be applied to a patient suffering from Heart Failure with preserved Ejection Fraction (HF-PEF) to permanently reduce end-diastolic pressure.

According to FIG. 1, the implantable device 200 comprises a stimulation unit 201 configured to stimulate a ventricle, particularly the right ventricle RV, and a sensing unit 202 for detecting atrial activity of the heart H, wherein the stimulation unit 201 is configured to stimulate the ventricle RV for at least one cardiac cycle with a predefined delay after detection of an atrial activity, and to subsequently stimulate the ventricle RV irrespective of atrial activity for at least one cardiac cycle or to not stimulate the ventricle RV for at least one cardiac cycle at all.

In case the right ventricle RV is stimulated as indicated in FIG. 1, for example, the implantable device 200 comprises a first electrode lead 210 configured to be implanted in the right ventricle RV and to apply electrical stimulation to the right ventricle RV generated by the stimulation unit 201, to which the first electrode lead 210 is electrically connected. Further, the implantable device 200 comprises a second electrode lead 220 configured to be implanted into the right atrium RA and configured to sense atrial activity of the right atrium RA. For this, the second electrode lead 220 is electrically connected to the sensing unit 202.

According to an embodiment of the present invention, stimulation unit 201 comprises a ventricular sensing unit for analyzing signals obtained via first electrode lead 210. Electrical signals measured via first electrode lead 210 are processed by the ventricular sensing unit for detection of activity of the right ventricle, for example.

Alternatively, the left ventricle LV can be stimulated instead. Furthermore, both ventricles RV and LV may also be stimulated.

Figure 2:
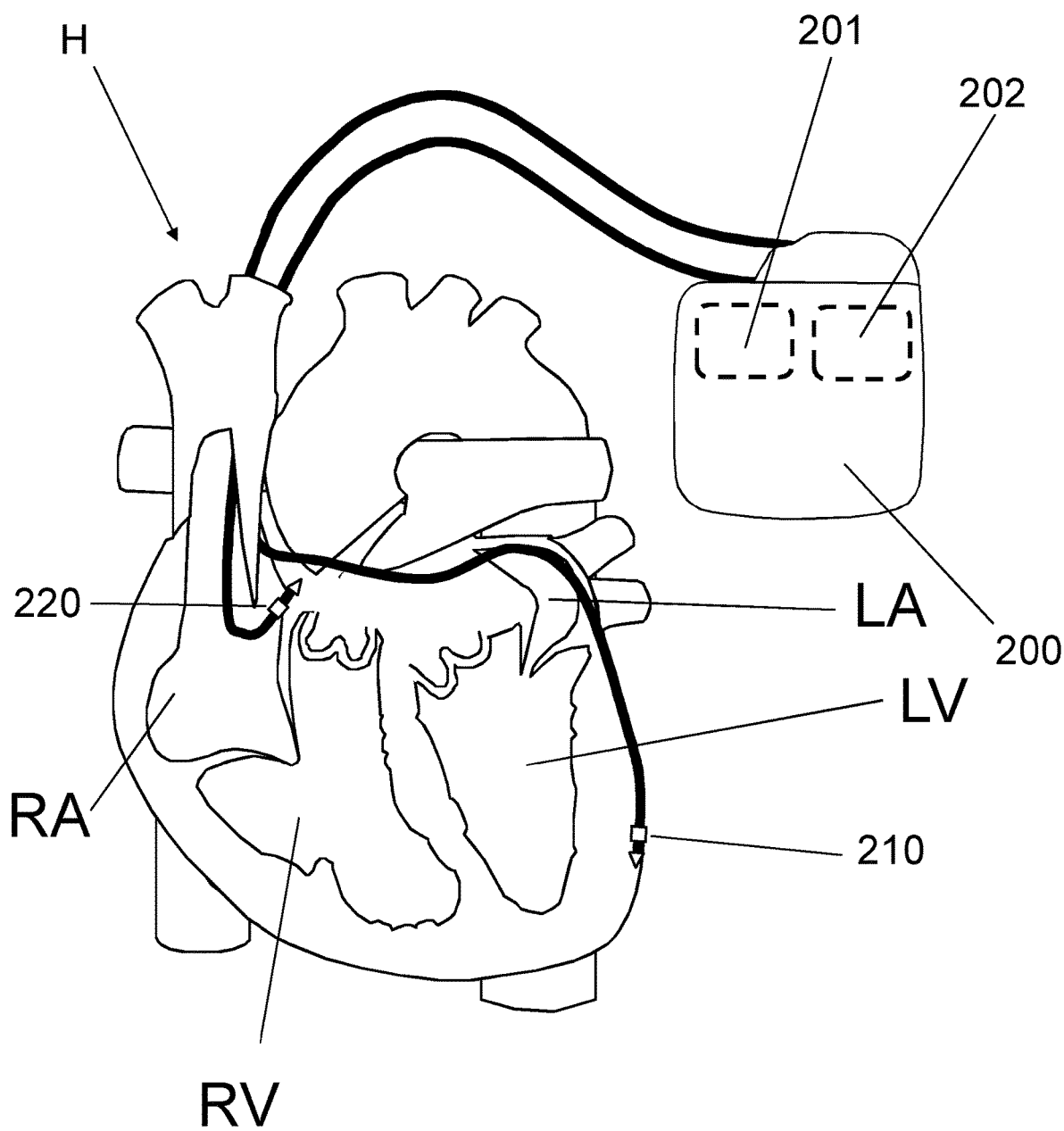

In case the left ventricle LV is stimulated as shown in FIG. 2, the first electrode lead 210 is configured to be implanted in the left ventricle LV and to apply electrical stimulation to the left ventricle LV, while the second electrode lead 220 can be configured as stated above (i.e., implanted in the right atrium).

Figure 3:
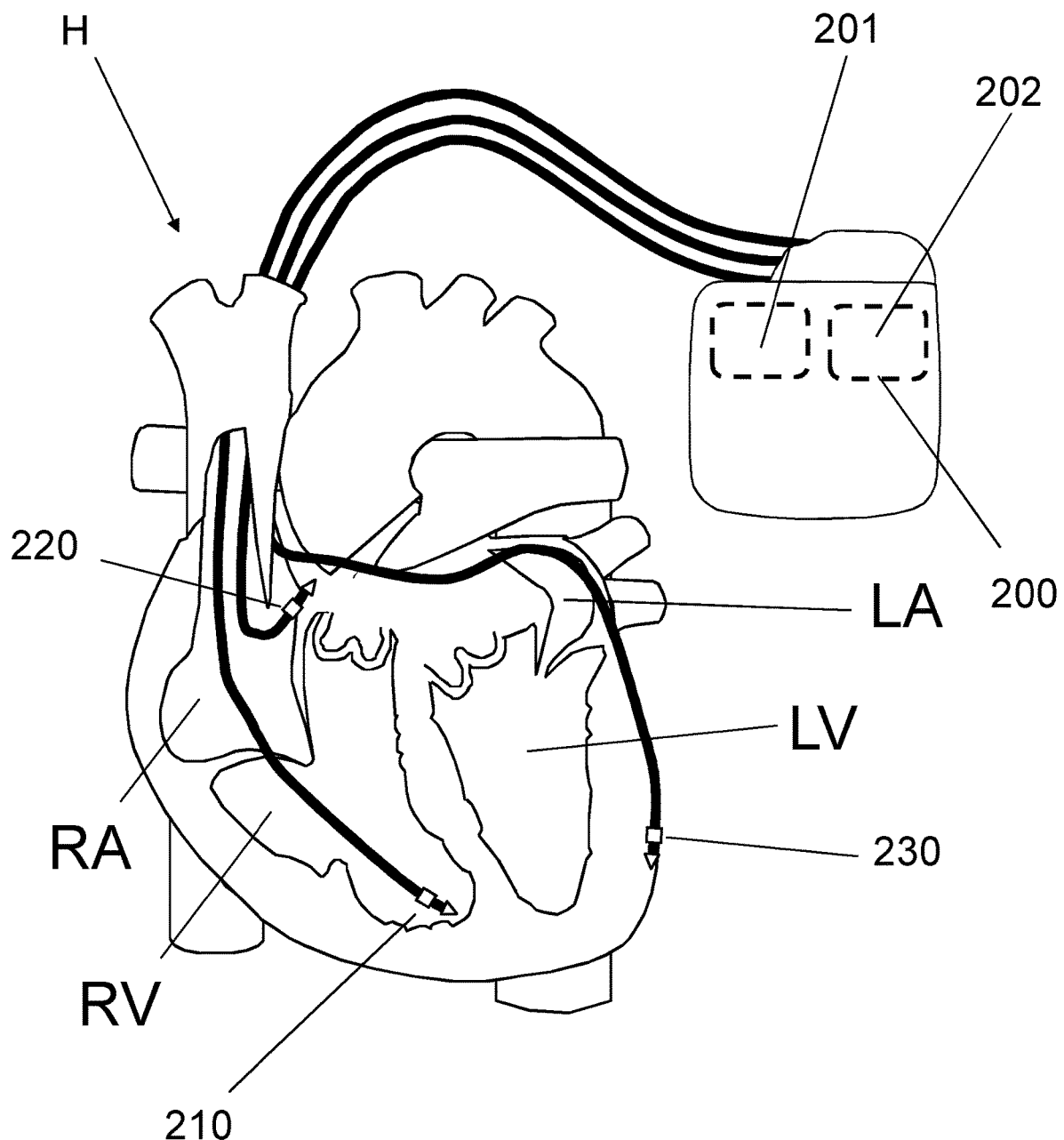

Furthermore, in case both ventricles are stimulated as shown in FIG. 3, the implantable device 200 can comprise a first electrode lead 210 configured to be implanted in the right ventricle RV and to apply electrical stimulation to the right ventricle RV, and a second electrode lead 220 configured to be implanted into the right atrium RA and configured to sense atrial activity of the right atrium RA, and a third electrode lead 230 configured to be implanted in the left ventricle LV and to apply electrical stimulation to the left ventricle LV.

Figure 4:
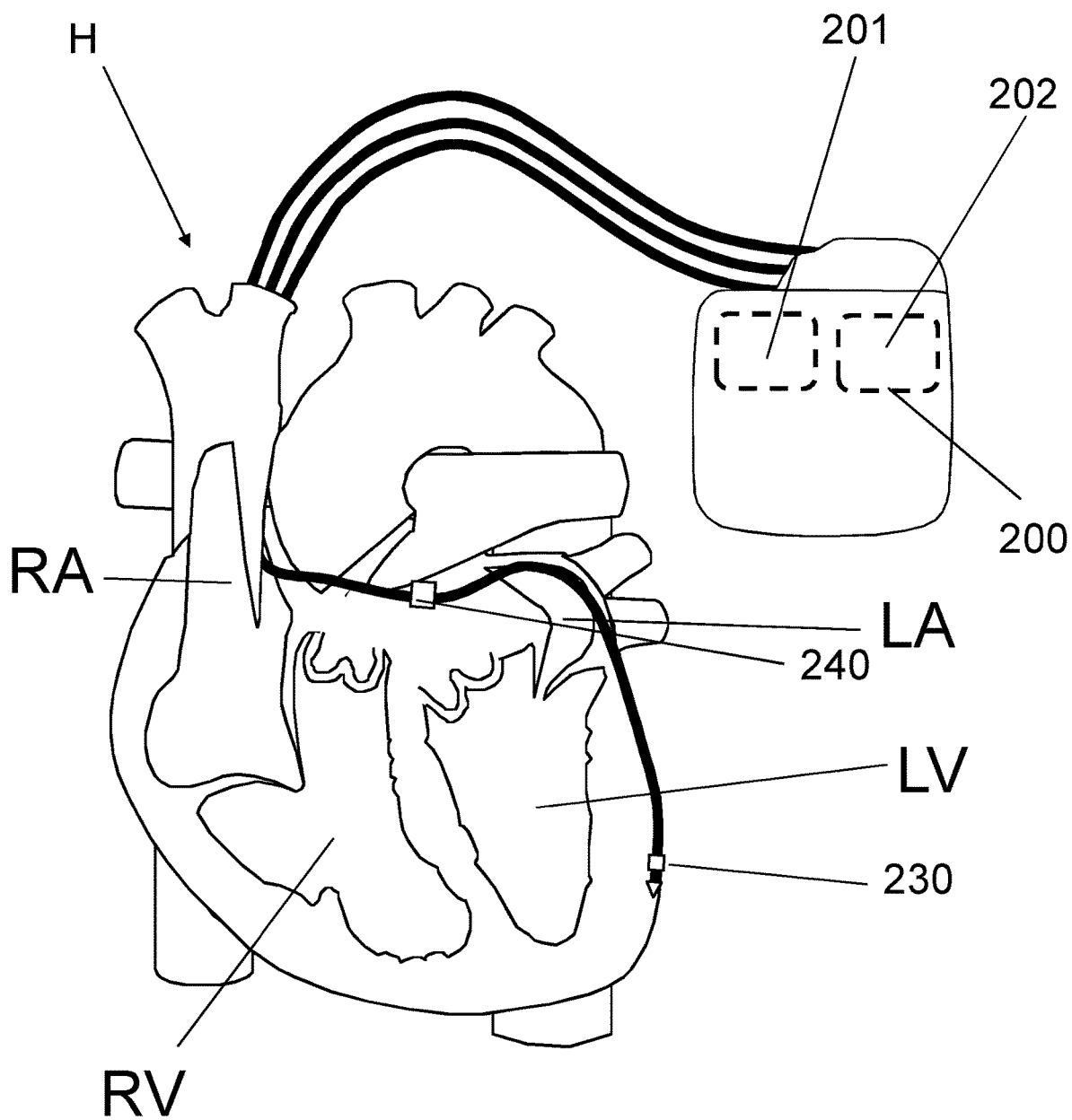

In all the cases stated above, instead of using the right atrium RA as shown in FIGS. 1 to 3, the atrial activity of the left atrium LA may also be sensed instead as shown in FIG. 4. For sensing the atrial activity of the left atrium LA, the respective electrode 230 implanted in the left ventricle LV may comprise one or more additional electrode poles 240 in the region of the left atrium LA to sense atrial activity of the left atrium LA. Thus, the electrode in the right atrium RA can be omitted.

Figure 5:
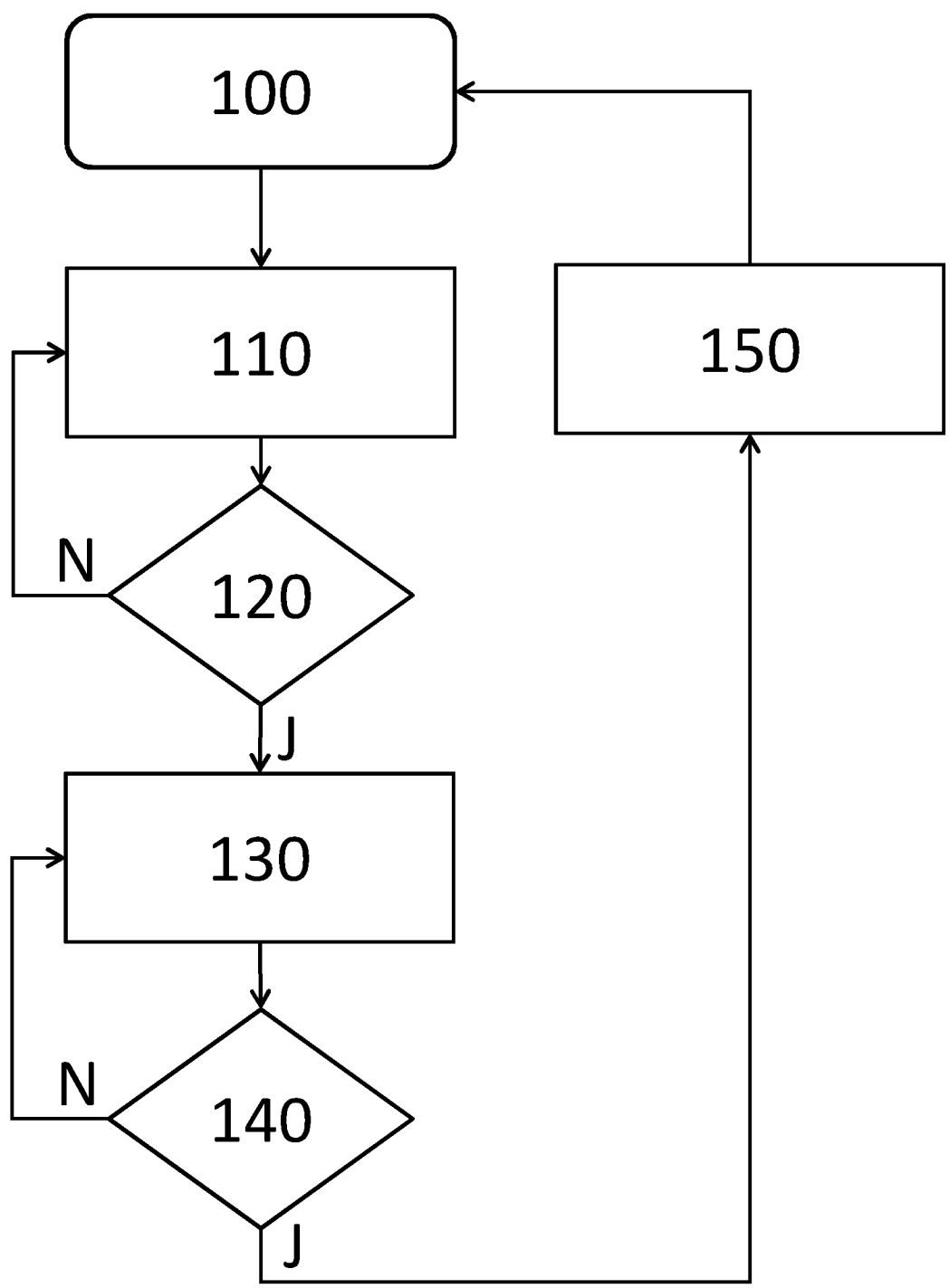
FIG. 5 shows a flow chart, wherein the functions of the respective implantable device according to the present invention as well as of the method according to the present invention may be carried out according to this flow chart.

FIG. 5 shows a flow chart according to which an embodiment of the method for lowering blood pressure according to the present invention can be conducted or according to which functions of an implantable device 200 according to the present invention can be processed.

First, the blood pressure-lowering therapy is initiated 100 by setting atrial controlled stimulation with a shortened delay in the stimulation unit 201. Initially, a programmed value is preferably selected here for the delay, which is preset by the user so that this time is shorter than the intrinsic AV delay of the patient. Atrial signals are preferably sensed with the sensing unit 202, wherein an atrial signal from the right atriums RA (cf. FIGS. 1 to 3) or from the left atrium LA may be used (cf. FIG. 4).

Subsequently, atrial-controlled ventricular stimulation takes place with this set delay 110, which causes the filling of the ventricle RV (and/or LV) to be terminated prematurely by the atrial contraction (reduced preload) and, as a result, a lower wall tension in the ventricle RV (and/or LV), which in turn causes a reduced inotropy and thus a reduction in the blood pressure for this heartbeat. This stimulation is repeated until a predefined number of ventricular stimulations 120, N has been performed.

When the number of ventricular intervals (heart cycles) is reached 120, J, the ventricular stimulation is switched off 130 and the ventricular rhythm is merely monitored or secured with a ventricular backup stimulation mode without atrial synchronization.

The suspension of the atrial controlled stimulation is performed with the aim of preventing blood pressure counter-regulation by the baroreceptors.

After a defined number of intrinsic heartbeats 140, J, the time duration of the current intrinsic AV delay of the patient is first measured and from this a shortened delay to be used for stimulations is determined 150. Then the atrial controlled stimulation 100, 110 by the stimulation unit 201 is reactivated with the newly determined delay.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

The invention claimed is:

1. An implantable device for stimulating a heart to lower blood pressure, comprising:
 a stimulation unit configured to stimulate a ventricle and/or an atrium, and
 a sensing unit for detecting atrial activity of the heart, wherein
 the stimulation unit is configured to stimulate the ventricle for at least one cardiac cycle with a predefined delay after detection of an atrial activity and to subsequently not stimulate the ventricle with a predefined delay after the detection of an atrial activity for at least one cardiac cycle, wherein the implantable device is configured to suspend stimulation of the ventricle triggered by said detection of an atrial activity after a predefined number of heart cycles or after a predetermined time period for a number of heart cycles or for a predetermined time period,
 wherein the stimulation unit is configured to stimulate the ventricle irrespective of atrial activity for at least one cardiac cycle after the detection of an atrial activity or after the stimulation of the atrium in the absence of intrinsic AV conduction.

2. An implantable device for stimulating a heart to lower blood pressure, comprising:

a stimulation unit configured to stimulate a ventricle, and a sensing unit for detecting atrial activity of the heart, and a stimulation unit configured to stimulate an atrium, wherein the stimulation unit is configured to stimulate the ventricle for at least one cardiac cycle with a predefined delay after detection of an atrial activity or with a predefined delay after the stimulation of an atrium and to subsequently not stimulate the ventricle with a predefined delay after the detection of an atrial activity for at least one cardiac cycle, wherein the implantable device is configured to suspend stimulation of the ventricle triggered by said detection of an atrial activity or triggered by an atrial stimulation after a predefined number of heart cycles or after a predetermined time period for a number of heart cycles or for a predetermined time period, wherein the stimulation unit is configured to stimulate the ventricle irrespective of atrial activity for at least one cardiac cycle after the detection of an atrial activity or after the stimulation of the atrium in the absence of intrinsic AV conduction.

3. The implantable device according to claim 1, wherein said delay is less than 100 ms.

4. The implantable device according to claim 1, wherein said delay is adjustable, and wherein the implantable device is configured to adjust the delay to be shorter than an intrinsic AV delay of the patient.

5. The implantable device according to claim 1, wherein the implantable device comprises a ventricular sensing unit, and wherein the implantable device is configured to measure an intrinsic AV delay of the patient and to adjust said adjustable delay depending on the measured intrinsic AV delay, wherein the adjustable delay is adjusted to be shorter than said measured intrinsic AV delay.

6. The implantable device according to claim 1, wherein the implantable device is configured to suspend the stimulation of the ventricle triggered by the detection of an atrial activity or triggered by the atrial stimulation depending on one or more parameters that can be assigned to the systemic blood pressure.

7. The implantable device according to claim 6, wherein the implantable device is configured to measure the respective parameter or to receive the respective parameter from another device.

8. The implantable device according to claim 1, wherein the ventricle is the right ventricle, or wherein the ventricle is the left ventricle, or wherein the stimulation unit is configured to stimulate the left and the right ventricle for at least one cardiac cycle with said predefined delay after the detection of an atrial activity or after the stimulation of the atrium, and configured to subsequently not stimulate the left and the right ventricle with a predefined delay after the detection of an atrial activity or with a predefined delay after the stimulation of the atrium for at least one cardiac cycle.

9. A method for lowering blood pressure by means of cardiac stimulation, particularly using an implantable device according to claim 1, wherein the ventricle is stimulated for at least one cardiac cycle with a predefined delay after detection of an atrial activity or with a predefined delay after the stimulation of an atrium and is subsequently not stimulated synchronously after atrial activity or an atrial stimulation for at least one cardiac cycle, wherein the ventricle is stimulated irrespective of atrial activity for at least one cardiac cycle after the detection of an atrial activity or after the stimulation of the atrium in the absence of intrinsic AV conduction.

10. The method according to claim 9, wherein the ventricle is stimulated for at least one cardiac cycle with a predefined delay after detection of an atrial activity or with a predefined delay after the stimulation of the atrium and is subsequently not stimulated synchronously after atrial activity or the atrial stimulation for at least one cardiac cycle.

11. The method according to claim 9, wherein the cardiac stimulation is delivered to patients indicated with Heart Failure with preserved Ejection Fraction.

* * * * *